United States Patent [19]
Domaas

[11] 3,733,918
[45] May 22, 1973

[54] CENTRIFUGAL CLUTCH

[75] Inventor: Perry M. Domaas, Minneapolis, Minn.

[73] Assignee: Textron Inc., Providence, R.I.

[22] Filed: Mar. 9, 1972

[21] Appl. No.: 233,223

Related U.S. Application Data

[63] Continuation-in-part of Ser. No. 82,633, Oct. 21, 1970.

[52] U.S. Cl. ................. 74/230.17 E, 192/105 C
[51] Int. Cl. ............................................. F16h 55/52
[58] Field of Search ........................... 74/230.17 E; 192/89 W, 105 C

[56] References Cited

UNITED STATES PATENTS

| | | | |
|---|---|---|---|
| 3,066,546 | 12/1962 | Thostenson | 74/230.17 E |
| 3,605,510 | 9/1971 | Laughlin | 74/230.17 E |
| 3,266,330 | 8/1966 | Galleher | 74/230.17 E |

*Primary Examiner*—Charles J. Myhre
*Assistant Examiner*—R. H. Lazarus
*Attorney*—Ralph F. Merchant, John D. Gould, Phillip H. Smith et al.

[57] ABSTRACT

The disclosure is directed to a variable ratio centrifugal clutch having driving and driven assemblies connected by an endless belt. The driving assembly consists of a pair of sheaves affixed to a drive shaft, one being axially stationary and the other being axially movable with respect thereto. The movable sheave forms part of an enclosed housing in which a plurality of flyweights are pivotally mounted. The flyweights operate in conjunction with a stationary member which is also disposed inside the enclosure. Guide members formed integrally with the rotatable enclosure operate in conjunction with guiding portions of the axially stationary member to insure proper relative axial movement therebetween. In response to increases in drive shaft speed, the flyweights swing outward and engage the stationary member to move the housing in its entirety along the shaft to bring the sheaves together.

11 Claims, 8 Drawing Figures

PATENTED MAY 22 1973
3,733,918
SHEET 1 OF 3
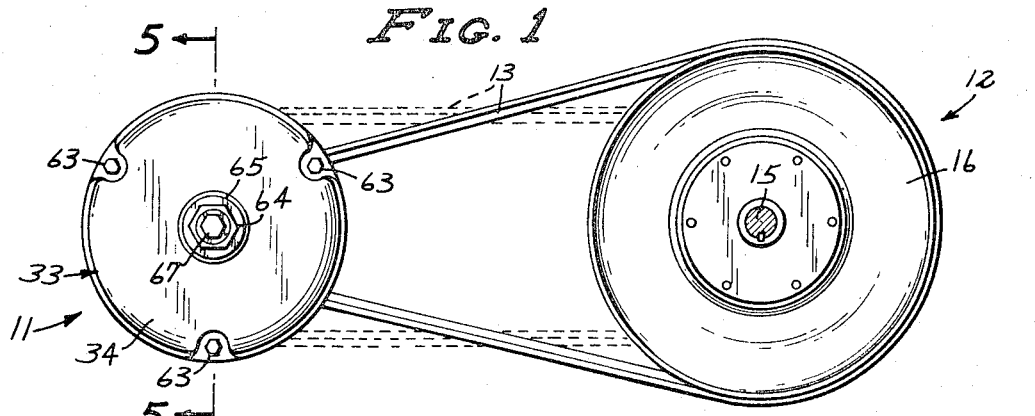
FIG. 1
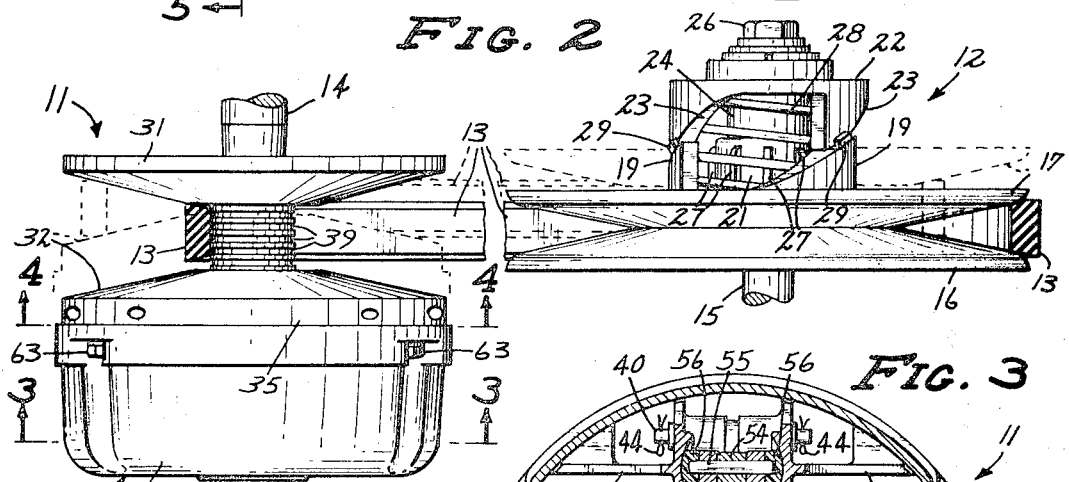
FIG. 2
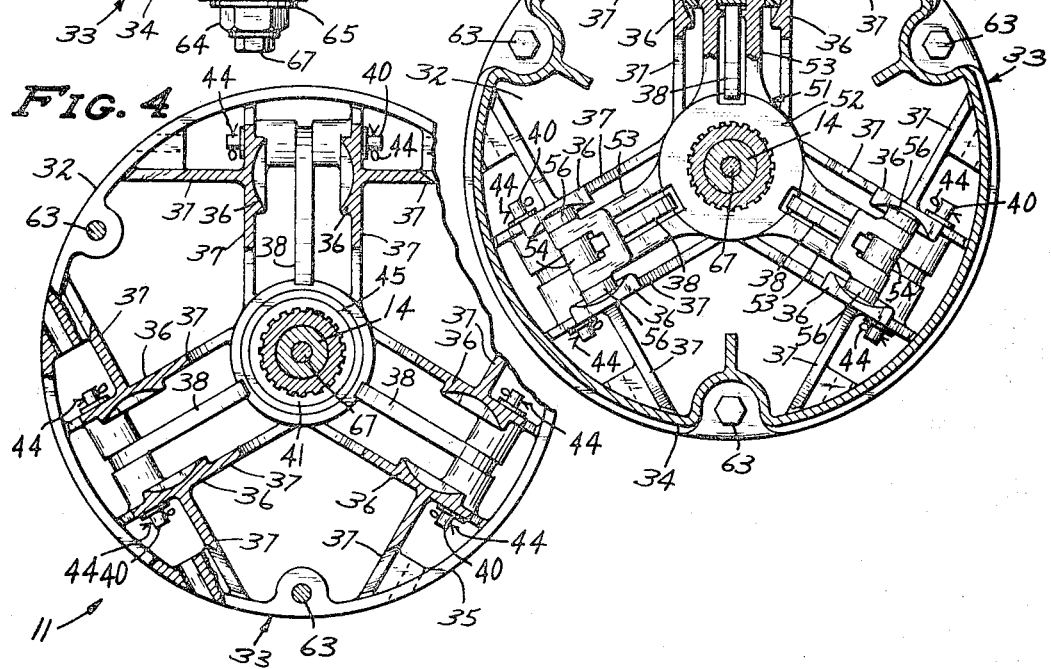
FIG. 3
FIG. 4

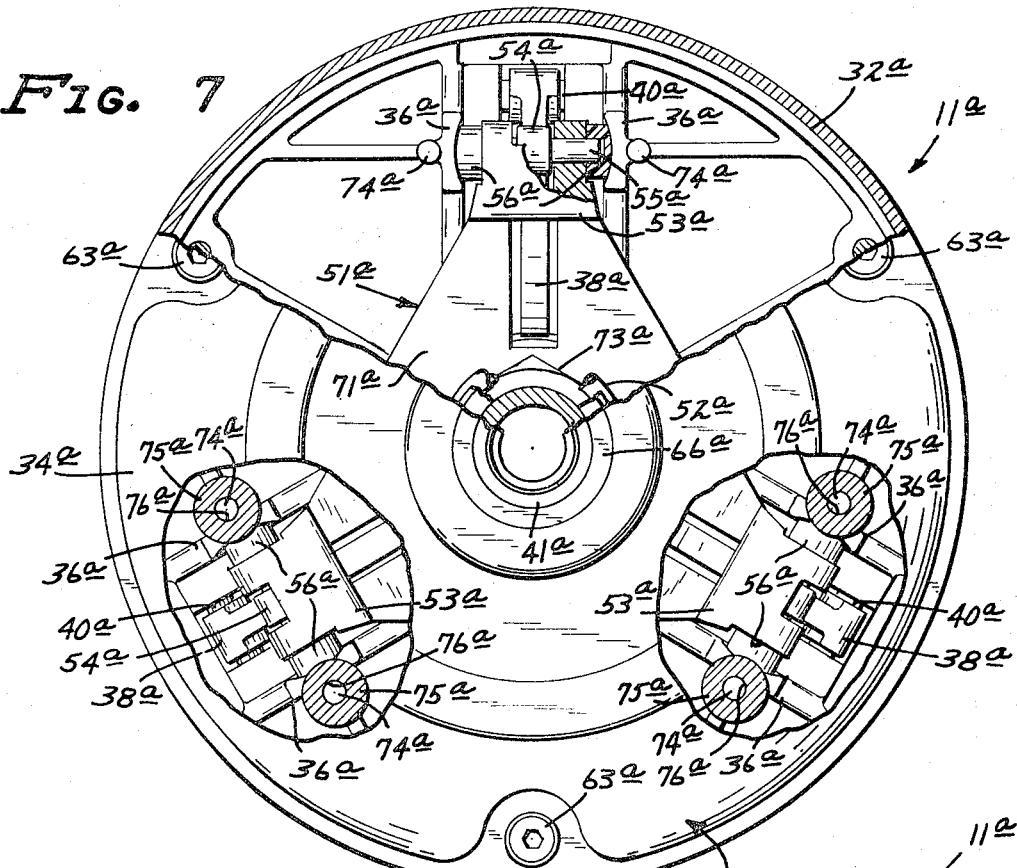
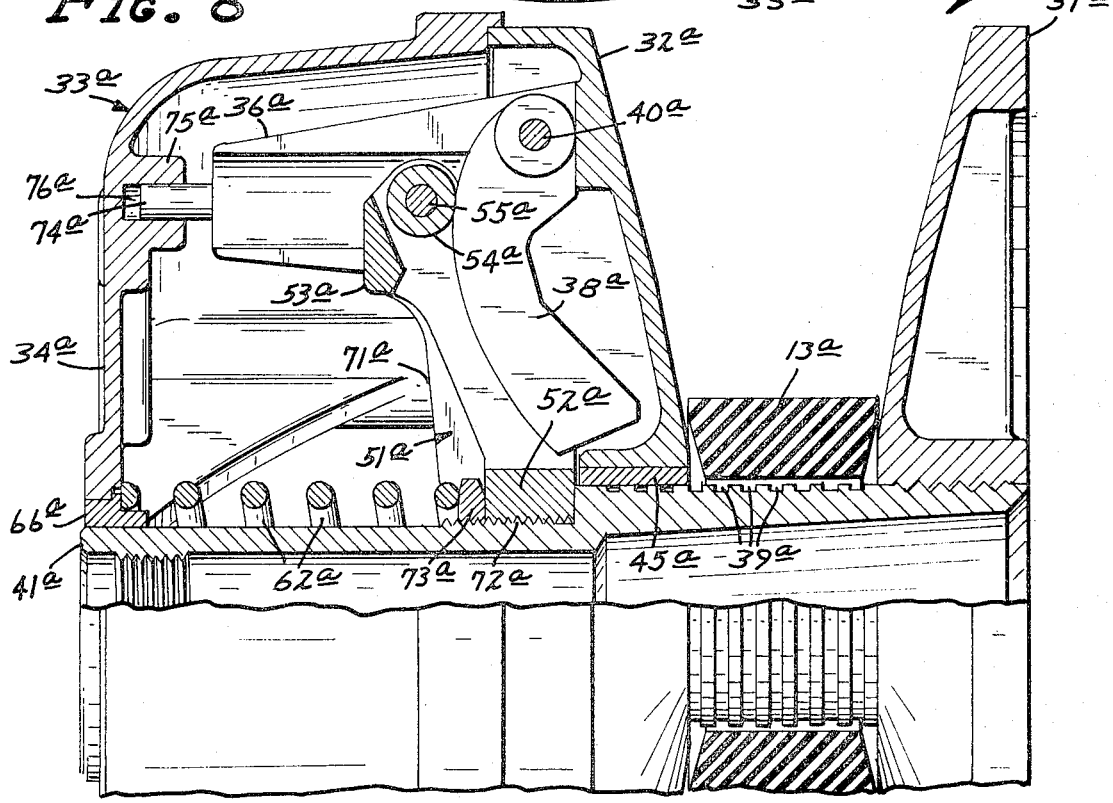

CENTRIFUGAL CLUTCH

This application is a continuation in part of application Ser. No. 82,633, filed Oct. 21, 1970.

The invention falls within the art of centrifugal clutches generally, and is specifically directed to centrifugal clutches consisting of driving and driven assemblies that vary the ratio of input shaft rotation to output shaft rotation.

Centrifugal clutches of this specific type find particular application in conjunction with smaller internal combustion engines where the use of gear transmissions is impractical or too costly. By providing a variable ratio or input to output rotational speed, the clutch serves as both clutch and transmission.

The driving assembly of a variable ratio centrifugal clutch ordinarily consists of a pair of sheaves mounted for rotation on a drive shaft, one of the sheaves being axially stationary on the shaft and the other being axially movable to effect the clutching operation. The position of the movable sheave is governed by a plurality of flyweights that rotate with the shaft and are mounted to swing radially outward in response to increases in shaft speed. The flyweights include cam surfaces, and through engagement with cooperating cam follower surfaces the sheave is moved axially along the shaft.

Since proper operation of the clutch is dependent on movement of the flyweights, it is imperative that all of the moving parts, including flyweights, pivotal connections, cam and cam following surfaces, be kept clean and protected from direct, mud and other potentially damaging substances.

One successful solution to this problem forms the subject matter of a patent application filed on Oct. 24, 1969 in the name of Eugene W. Laughlin, Ser. No. 869,165 and entitled "Centrifugal Clutch." That application discloses a centrifugal clutch comprising an axially stationary sheave mounted on a rotatable shaft, a flyweight-carrying member which also rotates with the shaft and is axially stationary thereon, and an enclosure which forms the second sheave. The enclosure fully encloses the flyweight carrying member and is axially movable with respect thereto.

This invention is an improvement on the aforesaid patent application, and specifically contemplates the provision of structure for effecting proper axial movement of the enclosure with respect to the axially stationary member. The improvement comprises guiding means formed on the inner surface of the enclosure and which project in cantilever fashion for receiving engagement with guide portions on the enclosed axially stationary member. This structure not only permits improved relative axial movement, but also lends itself to placement of the flyweights and the surfaces which they engage in the respective guiding areas. This eliminates the need for completely separate structure for flyweight and guiding operation, which in turn simplifies the overall structure and its method of assembly.

Another advantage arises from the enclosure structure, which preferably consists of a sheave and a bell housing which are sealably merged. With the guiding members projecting in cantilever fashion from the inner face of the sheave, no components other than the sheave itself are formed with or connected to the bell housing. Consequently, assembly of the clutch is further simplified and full access to the inside of the clutch for purposes of maintenance and repair is provided.

In an alternative embodiment, means are provided for interlockably connecting the projecting guiding members with the bell housing. The interlocking structure serves to resist centrifugal forces exerted on the guide members as a result of clutch rotational velocity, thus providing an additional safety factor through the reduction of wear and fatigue of the members due to strain.

An advantage which is not evident from mere observation of the clutch is its ability to operate more smoothly than existing clutches through the entire operating range of shaft rpm's. One reason for this appears to result from the ability to establish dynamic balance of the overall assembly during its manufacture. This is made possible through integral formation of the guiding means on the inner surface of the sheave and automatic alignment of the components during assembly. Another reason appears to reside in the confinement of component movement to specific areas within the enclosures; viz., the areas of guided axial movement. The resultant smooth operation is not only more desirable from the standpoint of vehicle operation, but also decreases component wear significantly, thereby decreasing the chance of clutch failure and increasing the period of service free operation.

BRIEF DESCRIPTION OF THE DRAWINGS

FIG. 1 is an elevational view of a variable ratio centrifugal clutch consisting of a driving portion and driven portion;

FIG. 2 is an enlarged top elevational view of the variable ratio centrifugal clutch shown in FIG. 1, portions thereof broken away;

FIG. 3 is an enlarged cross sectional view of the centrifugal clutch driving portion taken along the line 3—3 of FIG. 2, a portion thereof being viewed in further section;

FIG. 4 is an enlarged cross sectional view of the centrifugal clutch driving portion taken along the line 4—4 of FIG. 2, a portion thereof being taken in further sections;

FIG. 7 is an elevational view of an alternative centrifugal clutch driving assembly, portions thereof broken away and shown in section; and FIG. 8 is a fragmentary side elevational view of the alternative driving assembly, portions thereof being broken away and shown in section.

DESCRIPTION OF THE PREFERRED EMBODIMENT

Figure 5:
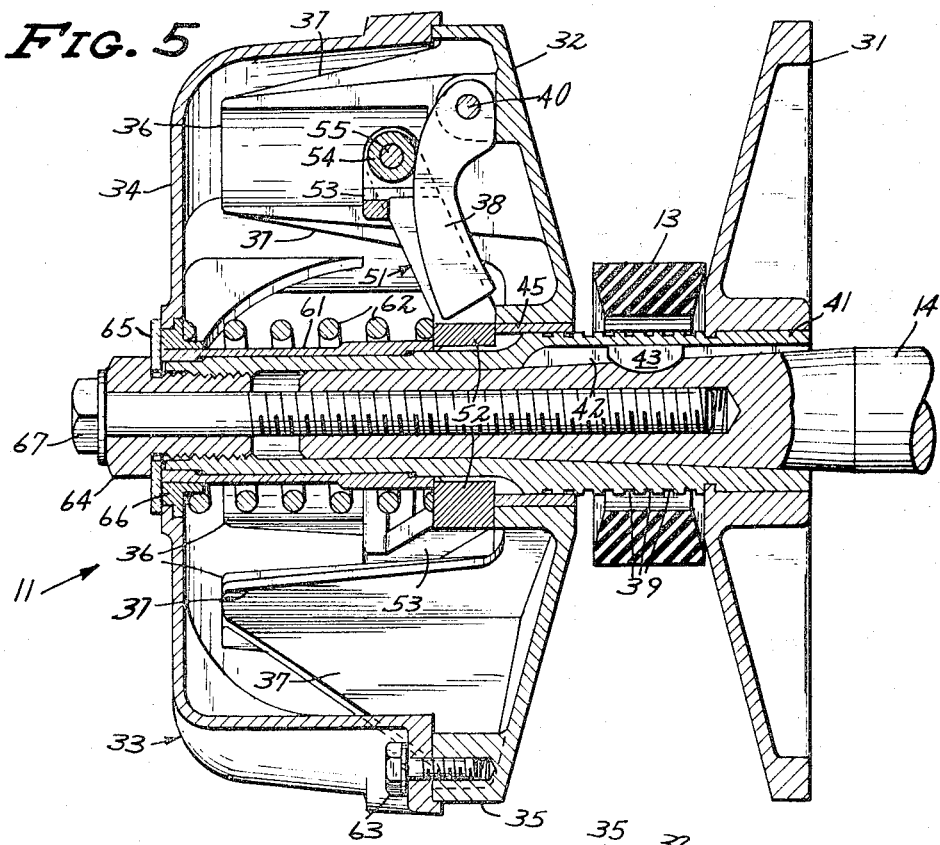
FIG. 5 is an enlarged sectional view of the clutch driving portion in one operating position, taken along the line 5—5 of FIG. 1.

In FIG. 1, a variable ratio centrifugal clutch is shown, consisting of a driving assembly 11 and a driven assembly 12 interconnected by an endless belt 13. Referring initially to FIG. 2, driving assembly 11 is shown to be mounted on an output drive shaft 14 of a power plant (not shown), while driven assembly 12 is mounted on an output shaft 15 adapted for connection with a utilization device (not shown). Driven assembly 12 consists of a stationary sheave 16 and a sheave 17 that is axially movable on shaft 15 as discussed below.

Forming part of sheave 17 are three ramp sections 19 (only two of which can be seen in FIG. 2) and a hub 21. A ramp member 22 includes three ramp surfaces 23 corresponding to ramp sections 19, and a central portion 24 which is suitably secured to shaft 15 as by a slot and key or splining. A spring 28 is disposed in compression between sheave 17 and member 22, and the entire assembly is held in place by a bolt 26 which threades into shaft 15. Hub 21 has a plurality of spacers 27 which keep spring 28 in proper alignment.

As assembled, sheave 17 is normally urged toward stationary sheave 16 by spring 28, but by application of a proper force spring 28 can be overcome so that sheave 17 moves both rotationally and axially by virtue of ramp sections 19 engaging ramp surfaces 23. In order to prevent excess wear therebetween, ramp surfaces 23 are provided with pads 29 which also provide a desired frictional relationship between the two.

Driving assembly 11 also has a stationary sheave 31 fixed on shaft 14 and a movable sheave 32 (see also FIG. 4) that forms part of a movable enclosure 33. Enclosure 33 is normally urged away from sheave 31, but in response to increasing angular velocity of shaft 14 moves axially as shown by the dotted lines of FIG. 2. Belt 13 normally occupies a slack position against shaft 14 when driving assembly 11 revolves slowly, but as enclosure 33 progresses axially it is forced radially outward, also as represented by dotted lines.

With the movement of belt 13 radially outward on driving assembly 11, movable sheave 17 of driven assembly 12 also begins to move away from sheave 16 against the bias of spring 28. However, before this can occur the coefficient of static friction existing between pads 29 and ramps sections 19 must be overcome. Rotation of both assemblies 11 and 12 is in the counterclockwise direction as seen in FIG. 1, so that when the static friction of pads 29 and the biasing force of spring 28 are overcome sheave 17 moves clockwise against belt movement, and the gripping force between belt 13 and sheaves 16 and 17 therefore remains great. Thus, for increasing angular velocity of shaft 14, enclosure 33 approaches stationary sheave 31 to move belt 13 radially outward from its slack position, which in turn causes belt 13 to move radially inward with respect to driving assembly 12, resulting in rotation of output shaft 15.

Since the radial position of belt 13 with respect to sheaves 31 and 32 of driving assembly 11 and sheaves 16, 17 of driven assembly 12 varies as a function of the angular velocity of shaft 14, it follows that the ratio of revolutions of the shaft 15 also varies as a function of shaft 14 speed. As low rpm's, this ratio is infinite since shaft 14 revolves and belt 13, in its slack position, is unable to transmit rotational energy to driven assembly 12 and output shaft 15 cannot revolve. With increasing rpm's by shaft 14, this ratio is decreased since the radial distance of belt 13 from shaft 14 is increasing while its radial distance from shaft 15 is decreasing. By virtue of this variable ratio feature, the centrifugal clutch performs the function of both clutch and transmission.

Figure 6:
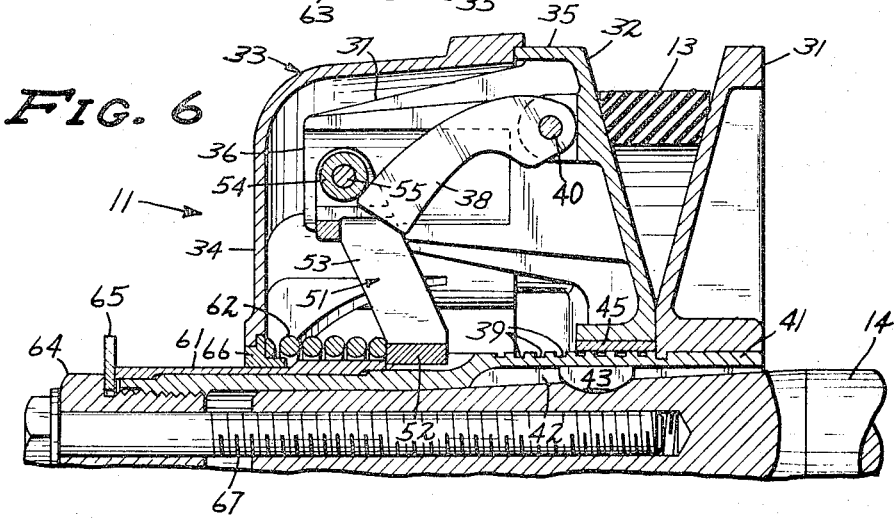
FIG. 6 is the enlarged view of FIG. 5 taken in another operating position, portions thereof being broken away.

FIGS. 3–6 show driving assembly 11 in detail. FIGS. 5 and 6 show fixed sheave 31 to be affixed to one end of a tubular shaft 41 which is slidably carried by movable housing 33, as will be described in further detail below. Shaft 14 has a tapered end which is received by tubular shaft 41 and is rotationally affixed thereto by means of a key 43 which is disposed in a keyway 42. In this area engaged by belt 13, tubular shaft 41 has an increased diameter and includes a plurality of annular grooves 39 which assist in keeping shaft 41 free of mud, snow, ice, burned rubber, etc.

As mentioned above, movable sheave 32 constitutes one part of movable housing 33, the other component consisting of a bell shaped housing 34. The external shape of sheave 32 is defined by the conical clutching surface and a peripheral edge 35 (FIG. 5). Integrally formed on the inner or unexposed face of movable sheave 32 are six guiding members 36 which are disposed in opposed pairs. Members 36 project in cantilever fashion away from the clutching surface of movable sheave 32, and each is given support by a triangular strengthening web 37. As best shown in FIG. 4, the opposed faces of each pair of guiding members 36 form arcuately shaped bearing surfaces over the major portion of their projected length, for a purpose which will become evident below.

Pivotally mounted between each pair of guiding members 36 is a flyweight 38, each of which has an arcuate cam face. This pivotal mounting is accomplished by means of a pivot pin 40, which extends through a bore formed in a thickened portion joining the bases of guiding members 36 and through an opening formed in the flyweight 38 itself. Pivot pin 40 is held in place by a pair of cotter pins 44. Sheave 32 has a centered opening lined with a bearing 45, which permits it to slidably move over the enlarged portion of shaft 41.

An axially stationary member 51 consisting of a hub 52 and three radially extending arms 53 is splined on shaft 41 for rotation therewith. As best shown in FIG. 3, each of the arms 53 is bifurcated and carries a roller and guide assembly at the outer end thereof. This assembly comprises a roller 54, which is disposed between the bifurcations of each arm 53 and is rotatably held in place by a pin 55 which extends through roller 54 and aligned openings formed in the bifurcations. Each of the rollers 54 is positioned for cam following engagement by an associated flyweight 38.

As shown in that portion of FIG. 3 in which one of the arms 53 is shown in partial section, pin 55 projects outwardly of each of the bifurcated portions. A low friction, dome-shaped nylon cap 56 is inserted over each of these projecting pin ends for engagement with the adjacent arcuate bearing surface of an associated guiding member 36. The distance between the outer faces of cap 56 is slightly less than the distance between opposed arcuate bearing surfaces in order that sheave 32 may easily move on shaft 41 in the desired guided manner.

Member 51 is kept in an axially fixed position on shaft 41 by a tubular sleeve 61, which abuts the member and forces it against the enlarged portion of shaft 41. A spring 62 is then inserted over sleeve 61 until it abuts members 51, and bell housing 34 completes the assembly of enclosure 33. Housing 34 has an inwardly forming diameter conforming to the peripheral flange 35 of sheave 32, and it is sealably fastened thereto by means of circumferentially spaced bolts 63 and a tubular center bolt 64 and washer 65. Spring 62 is placed in compression through its engagement with member 51 and collar bearing 66, so that sheave 32 is normally biased away from sheave 31.

The entire clutch assembly is affixed to shaft 14 by means of a bolt 67, which projects through centerbolt 64 and screws into a threaded portion of shaft 14.

In operation, driving assembly 11 is in the position shown in FIG. 5 when shaft 14 is at rest. There is no force to oppose the biasing force of spring 62, and with sheave 32 in its farthest position from sheave 31 flyweights 38 assume the position shown in FIG. 5. As shaft 14 begins to rotate and increases in angular velocity, flyweights 38 begin to move radially outward by virtue of the centrifugal force acting through their respective centers of mass. The cam face of each of the flyweights 38 engages its associated roller 54, and, since member 51 is axially fixed on shaft 41, the entire enclosure 33 moves toward stationary sheave 31. With increasing rpm's of shaft 14, sheave 32 engages belt 13, causing it to move radially outward on the conical surfaces of sheaves 31 and 32, and thereby changing the rpm ratio between driving assembly 11 and driven assembly 12 (see FIG. 6).

Although the torsional forces acting between member 51 and sheave 32 are great, the guiding assembly comprising guiding members 36, arms 53 and caps 56 prevents relative rotational movement between sheave 32 and shaft 41 while permitting smooth and accurate relative axial movement therebetween. I have found that caps 56 undergo negligible wear over extended periods of usage while guiding the relative axial movement without binding. The structure also provides an inherent position limit for flyweights 38, which are confined to the maximum outer position shown in FIG. 6 by the axial spacing between member 51 and sheave 32, thereby preventing malfunction arising from excessive flyweight movement.

FIGS. 7 and 8 depict an alternative embodiment of a centrifugal clutch driving assembly in which parts alike or similar to those of the embodiment of FIGS. 1-6 are represented by the same numeral with the letter *a* added.

The driving assemblies 11 and 11*a* are much the same as far as general construction is concerned, although, as indicated in FIG. 8, the axially stationary member 51*a* includes strengthening webs 71*a* between the arms 53*a*. Further, the member 51*a* is held in an axially stationary position within the enclosure 33*a* by threadable engagement with a threaded portion 72*a* on the shaft 41*a* and a following lock nut 73*a*. The spring 62*a* is compressibly disposed between the lock nut 73*a* and the collar bearing 66*a*.

The primary structural difference between driving assemblies 11 and 11*a* resides in the inclusion in the latter of means for interlockably connecting each of the guiding members 36*a* with the bell housing 34*a*. Preferably, this interlocking structure comprises a pin 74*a* integrally formed with each guiding member 36*a* and projecting toward the cover 34*a*. Alignably disposed with each of the pins 74*a* is a boss 75*a* integrally formed on the inner face of bell housing 34*a*. Each of the bosses 75*a* has a bore 76*a* formed therein, which is commensurately sized with the pin 74*a* to slideably receive the pin when the bell housing 34*a* and sheave 32*a* are brought into cooperative engagement. The pins 74*a* are automatically aligned with the bores 76*a* by reason of the guiding engagement between guiding members 36*a* and end caps 56*a*.

It will be appreciated that the interlockable pins 74*a* and bosses 75*a* with bores 76*a* together resist centrifugal force exerted on the respective guiding members 36*a* by reason of rotational velocity of the assembly 11*a*, and serve as an additional safety factor through the reduction of wear and fatigue due to strain.

I claim:

1. A centrifugal clutch comprising:
   a. rotatable shaft means;
   b. first rotatable means mounted on the shaft means and axially stationary thereon, the first rotatable means defining a first clutching surface;
   c. second rotatable means mounted on the shaft means and axially movable thereon, the second rotatable means comprising
      1. a clutching member defining a second clutching surface cooperable with the first clutching surface;
      2. and a cover member constructed for cooperable engagement with the clutching member to define a rotatable enclosure;
   d. third rotatable means mounted on the shaft means and disposed within said rotatable enclosure;
   e. one of said clutching and cover members having a plurality of pairs of spaced members projecting toward the other of said clutching and cover members, the opposed faces of each pair forming guiding surfaces;
   f. the third rotatable means further comprising a guiding member for each pair of spaced members, each guiding member constructed and arranged for cooperable, guiding engagement with the opposed guiding surfaces;
   g. a plurality of flyweights mounted on one of said second and third rotatable means and arranged to move radially outward with increasing rotational velocity of the shaft means, the flyweights engageable with the other of said second and third rotatable means to effect axial movement of the rotatable enclosure with respect to the first rotatable means;
   h. and means for interlockably connecting each of said projecting spaced members with the other of said clutching and cover members to resist centrifugal forces exerted on said projecting spaced members as a result of clutch rotation.

2. The centrifugal clutch defined by claim 1, wherein the interlockable connecting means comprises a first structural portion associated with each of the projecting spaced members and a second structural portion for each first structural portion disposed on the other of said clutching and cover members, the first and second structural portions constructed and arranged to mateably engage when the clutching and cover members are in cooperable engagement.

3. The centrifugal clutch defined by claim 1, wherein said pairs of spaced members are disposed on the clutching member.

4. The centrifugal clutch defined by claim 3, wherein the interlockable connecting means comprises:
   a. a pin projecting from the extreme end of each of said spaced members;
   b. and a plurality of bores disposed on the inner surface of said cover member in respective alignment with said pins.

5. The centrifugal clutch defined by claim 4, wherein each of said bores is formed in a boss integrally formed on the inner face of said cover member.

6. The centrifugal clutch defined by claim 4, wherein each of said pins is integrally formed with its associated spaced member.

7. A centrifugal clutch comprising:
a. rotatable shaft means;
b. first rotatable means mounted on the shaft means and axially stationary thereon, the first rotatable means defining a first clutching surface;
c. second rotatable means mounted on the shaft means and axially movable thereon, the second rotatable means defining a second clutching surface cooperable with the first clutching surface;
d. third rotatable means mounted on the shaft means and axially movable thereon, the third rotatable means constructed and arranged to cooperably engage with the second rotatable means to define a rotatable enclosure therewith;
e. one of said second and third rotatable means having a plurality of pairs of spaced members projecting toward the other of said second and third rotatable means, the opposed faces of each pair forming guiding surfaces;
f. actuating means disposed within said rotatable enclosure for effecting axial movement thereof with respect to the first rotatable means as a function of rotational velocity of the shaft means;
g. guiding means disposed within said rotatable enclosure and comprising a guiding member for each pair of spaced members, each guiding member constructed and arranged for cooperating, guiding engagement with the opposed guiding surfaces;
h. and means for interlockably connecting each of said projecting spaced members with the other of said second and third rotatable members to resist centrifugal forces exerted on said projecting spaced members as a result of clutch rotation.

8. The centrifugal clutch defined by claim 7, wherein the actuating means comprises:
a. a fourth rotatable means mounted on the shaft means and axially stationary thereon;
b. and a plurality of flyweights pivotally mounted on one of said second and fourth rotatable means and arranged to move radially outward with increasing rotational velocity of the shaft means, the flyweights being engageable with the other of said second and fourth rotatable means to effect said axial movement of the rotatable enclosure.

9. The centrifugal clutch defined by claim 7, wherein the first and second rotatable means comprise first and second sheaves, respectively, and the third rotatable means comprises a bell-shaped cover.

10. The centrifugal clutch defined by claim 9, wherein the pairs of spaced members are disposed on the second sheave, and the interlockable connection means comprises a first structural portion associated with each of the spaced members and a second structural portion for each first structural portion disposed on the inner surface of said cover, the first and second structural portions constructed and arranged to mateably engage with the second sheave and cover in cooperable engagement.

11. The centrifugal clutch defined by claim 10, wherein the first structural portions each comprise a pin, and the second structural portions each comprises a boss having a bore formed in alignment with the associated pin.

* * * * *